United States Patent Office 3,626,755
Patented Dec. 14, 1971

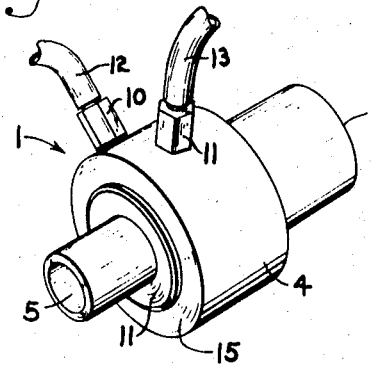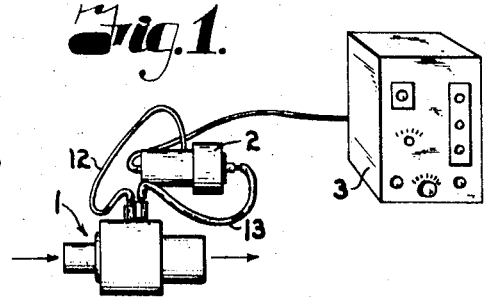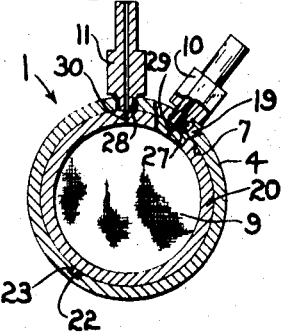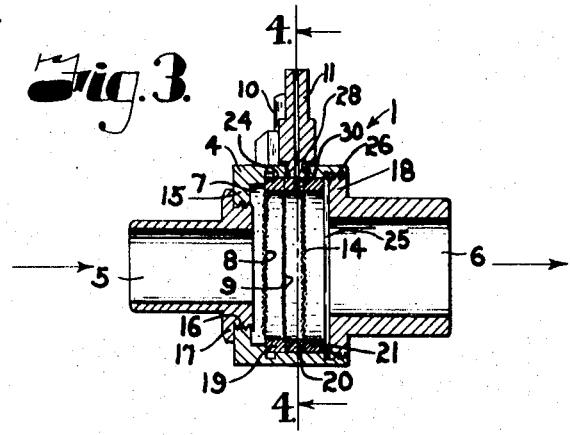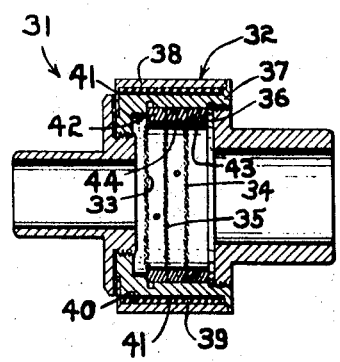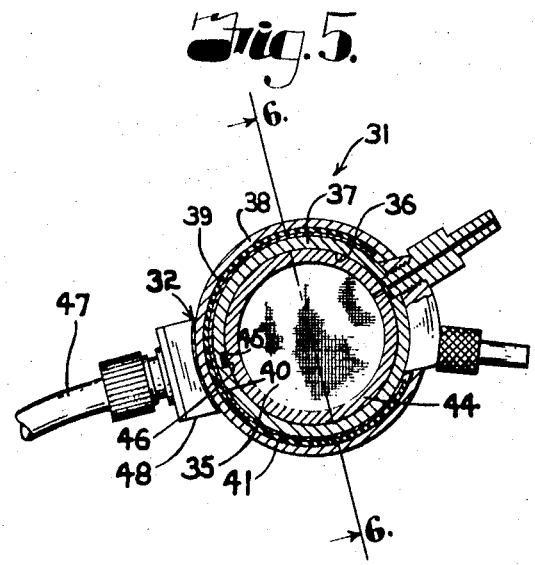

3,626,755
FLOW MEASURING APPARATUS
Hans Rudolph, Johnson County, Kans., assignor to
Hans Rudolph, Inc., Kansas City, Mo.
Filed Apr. 9, 1970, Ser. No. 26,821
Int. Cl. G01f 1/00
U.S. Cl. 73—205 L                                    4 Claims

ABSTRACT OF THE DISCLOSURE

A flow measuring apparatus for measuring fluid flow comprises a housing having a bore therethrough and a fluid passage mounted on each end of the housing and communicating with the bore. An end screen is positioned within the housing and adjacent each of the fluid passages to effect laminar flow of fluid and an intermediate screen is positioned between the end screens to effect a measurable pressure differential adjacent opposite sides of the intermediate screen. A pair of spaced apart taps are mounted on the housing for connection to a differential pressure measuring instrument, and said taps being positioned on each side of the intermediate screen in communication with the space between the intermediate screen and the respective end screen.

---

The present invention relates to fluid flow measuring apparatus and more particularly to a meter adapted for use in measuring respiratory gas flow, such as for a pneumotachograph.

The principal objects of the present invention are: to provide a flow measuring apparatus adapted to measure respiratory gas flow in either direction, such as for use in pulmonary physiology; to provide such a flow measuring apparatus for clinicians and physiologists having high accuracy; to provide such a flow measuring apparatus providing accurate measurement of respiratory gas flow to properly assess a plurality of pulmonary parameters; to provide such a flow measuring apparatus adapted to monitor ventilation during operative procedures; to provide such a flow measuring apparatus providing minimum respiratory resistance, rapid reaction, and existence of a proportional relationship between the velocity of the respiratory gas flow volume and the amplitude of the measured excursion; to provide such a flow measuring apparatus adapted to be connected to a differential pressure transducer for translating the differential pressures into electrical signals; to provide such a flow measuring apparatus effecting laminar flow of the respiratory gas flow and avoiding turbulence therein; to provide such a flow measuring apparatus adapted to give equal readings in both directions (inhaling and exhaling) and to give direct linear outputs to a pressure transducer thereby avoiding the requirement for especially designed electronics to linearize outputs from the pressure transducer; and to provide such a flow measuring apparatus which is precisely manufactured, durable in use, and particularly well adapted for the proposed use.

Other objects and advantages will become apparent from the following description taken in connection with the accompanying drawings, wherein are set forth by way of illustration and example, certain embodiments of this invention.

FIG. 1 is a perspective view of a fluid flow measuring apparatus embodying features of the present invention and showing indicating instruments associated therewith.

FIG. 2 is an enlarged perspective view of the fluid flow measuring apparatus.

FIG. 3 is a longitudinal sectional view through the flow measuring apparatus.

FIG. 4 is a transverse sectional view through the flow measuring apparatus taken on line 4—4, FIG. 2.

FIG. 5 is a transverse sectional view through a modified flow measuring apparatus showing a heating element mounted thereon.

FIG. 6 is a longitudinal sectional view through the modified flow measuring apparatus taken on line 6—6, FIG. 5.

Referring more in detail to the drawings:

The reference numeral 1 generally designates a flow measuring apparatus adapted for measuring gas flow and the flow measuring apparatus 1 is particularly adapted for accurately measuring low pressure and low volume respiratory gas flow for pulmonary physiological testing, such as for patients at rest or under the influence of an anesthetic. The flow measuring apparatus 1 effects a measurable pressure differential in respiratory gas flow. The pressures are transmitted to a differential manometer or pressure transducer 2 which translates the pressures into electronic signals which are conducted to an indicating instrument 3 for visually displaying selected functions of the respiratory gas flow through the flow measuring apparatus 1.

In the illustrated structure, the flow measuring apparatus 1 has a tubular body member or housing 4 with a fluid entranceway 5 and a fluid exit passage 6 in an aligned relation with a bore 7 extending through the tubular housing 4. A foraminous member 8 is mounted within the housing 4 and extends across the bore 7. The foraminous member 8 is positioned in spaced relation with the fluid entranceway 5 and is positioned normal to the flow of fluid through the bore 7 and has a plurality of openings therethrough arranged over the entire area of the foraminous member 8. Each of the many openings through the foraminous member 8 has a hydraulic diameter sufficiently small for assuring laminar flow of fluid.

A second foraminous member 9 is mounted in the housing 4 and extends across the bore 7 in spaced relation with and downstream of the foraminous member 8. The second foraminous member 9 is positioned normal to the flow of fluid through the bore 7 and has a plurality of openings therethrough arranged over the entire area of the second foraminous member 9. Each of the openings through the second foraminous member 9 has a hydraulic diameter sufficiently small for assuring a measurable pressure differential adjacent upstream and downstream sides of the second foraminous member 9.

Upstream and downstream pressure sensing means, illustrated as taps 10 and 11 respectively, are provided for communicating with points upstream and downstream of the second foraminous member 9 and the taps 10 and 11 are connectable to the pressure transducer 2 by means of suitable flexible tubes 12 and 13 respectively.

The openings through the foraminous member 8 form the entire flow area through the flow measuring apparatus 1 at the foraminous member 8 and the openings through the second foraminous member 9 form the entire flow area through the flow measuring apparatus 1 at the second foraminous member 9, whereby the entire flow of respiratory gases is available for measurement at the upstream and downstream taps 10 and 11.

Each of the openings through the second foraminous member 9 has a hydraulic diameter substantially smaller than the hydraulic diameter of the openings through the foraminous member 8 whereby the second foraminous member 9 effects a greater resistance to flow therethrough than the first foraminous member 8 thereby effecting a measurable pressure differential adjacent upstream and downstream sides thereof and laminar flow of fluid therethrough.

The foraminous member 8 and the second foraminous member 9 are spaced apart a distance greater than the hydraulic diameter of each of the openings through the foraminous member 8, however, the spacing is sufficiently close to maintain laminar flow therebetween.

It is desirable to accurately measure respiratory gas flow in both directions, such as for inhaling and exhaling, therefore, a third foraminous member 14 is mounted within the housing 4 and extends across the bore 7 in spaced relation with and downstream of the second foraminous member 9. The third foraminous member 14 is positioned normal to the flow of fluid through the bore 7 and has a plurality of openings therethrough arranged over the entire area of the third foraminous member 14.

Each of the openings through the third foraminous member 14 has a hydraulic diameter substantially equal to the hydraulic diameter of the openings through the first foraminous member 8, thereby assuring laminar flow of fluid. The openings through the third foraminous member 14 also form the entire flow area through the flow measuring apparatus 1 at the third foraminous member 14. The third foraminous member 14 is spaced from the second foraminous member 9 a distance substantially equal to the distance between the first and second foraminous members 8 and 9 whereby the flow may be measured in either direction, such as for inhaling and exhaling.

The flow area through the first and third foraminous members 8 and 14 is preferably substantially equal to the flow area through the passages 5 and 6 respectively whereby the first and third foraminous members 8 and 14 effect a minimum of resistance to flow of low pressure low volume respiratory gas flow while effecting laminar flow thereof.

In the illustrated structure, the body member 4 is illustrated as a generally cylindrical member having a flange 15 at one end thereof with an aperture 16 therethrough to receive the fluid entranceway 5 which is illustrated as a tubular member having a flange 17 having a reduced diameter and being threaded to be received within the aperture 16 which is also threaded to permit the flange 17 to be moved into engagement with an exterior surface of the flange 15 to provide a seal between the housing 4 and the fluid entranceway 5.

The fluid exit passage 6 is illustrated as a tubular member having a flange 18 on one end thereof with the outer periphery of the flange 18 shaped to be received within the bore 7 at the end of the housing 4 opposite the flange 15. The interior surface of the housing 4 defining the bore 7 and the exterior periphery of the flange 18 have interengaging threads whereby the exit passage 6 may be mounted therein.

Each of the foraminous members 8, 9, and 14 are reticulated screens formed by interweaving wires extending in normal relation. The screens are preferably formed of a plurality of uniformly spaced horizontal wires and a plurality of uniformly spaced vertical wires to form the previously described openings. Each of the reticulated screens 8, 9, and 14 are illustrated as generally circular and have the peripheral edge thereof mounted in frames 19, 20, and 21 respectively, each of which have an exterior surface received within the bore 7 and in a close fit with the interior surface of the housing 4.

Turbulence within the flow measuring apparatus 1 is substantially eliminated by aligning the openings through the screens 8, 9, and 14. In the illustrated structure, each of the frames 19, 20, and 21 has a guide member 22 mounted thereon and extending outwardly from the respective screen frame in a fixed relation to the openings in the respective reticulated screen, such as having the axis of the guide member 22 aligned with one of the vertical or horizontal wires or having the axis of the guide member 22 forming a diagonal through each of a selected group of openings through the respective screen.

Each guide member 22 is received within a groove or way 23 in the interior surface of the housing 4 with the groove or way 23 extending substantially parallel to the direction of flow of fluid through the bore 7 whereby the openings in the reticulated screens 8, 9, and 14 are positioned in alignment to reduce turbulence in the fluid flow therethrough.

It is essential to properly position the second screen 9 between the upstream and downstream taps 10 and 11, such as centered therebetween, to obtain accurate measurements for flow in both directions. In the illustrated structure, the frames 19, 20, and 21 each have a longitudinal dimension sufficient to be in end-to-end engagement when positioned within the bore 7 and the screens 8, 9, and 14 are positioned in the frames 19, 20, and 21 to provide the proper spacing between the screens.

Proper positioning of the screens is effected by engagement of one of the frames with a shoulder 24 extending normal to the interior surface of the housing 4. The shoulder 24 is in spaced relation with the taps 10 and 11, whereby the second foraminous member or screen 9 will be centered between the taps 10 and 11 when the frames 19, 20, and 21 are in end-to-end engagement and one end of one of the frames is in engagement with the shoulder 24, for example, frame 19, having the screen 8 therein.

It is desirable to resiliently maintain the above described position, therefore, a suitable seal member, such as an O-ring 25, is mounted in an annular recess 26 in the interior surface of the body member or housing 4, with the O-ring 25 preferably being in engagement with the end of the frame 21 having the third screen 14 therein to resiliently maintain the screens in position relative to the upstream and downstream taps 10 and 11 and to seal the frames to assure that the entire flow will pass through the openings in the screens. The end surface of the flange 18 of the exit passage 6 is engageable with the O-ring 25 to provide a seal between the housing 4 and the exit passage 6.

In the illustrated structure, communication between the upstream and downstream sides of the second foraminous member 9 is provided by ports 27 and 28 in the housing 4 for receiving the taps 10 and 11 respectively. The ports 27 and 28 are longitudinally spaced of the housing 4 whereby the ports 27 and 28 are positioned to communicate with the bore 7 adjacent opposite sides of the second screen 9, and the ports 27 and 28 are circumferentially spaced apart a distance which is sufficient to avoid influencing the pressure measurements.

Selected frames have ports therein which are alignable with the ports 27 and 28 for communication with the taps 10 and 11. In the illustrated structure, the frame 19 having the foraminous member 8 mounted therein and the frame 20 having the second foraminous member 9 mounted therein, have ports 29 and 30 respectively which are alignable with the ports 27 and 28 when the guide members 22 are received within the groove or way 23 and the frames 19, 20, and 21 are in end-to-end engagement with the frame 19 having the foraminous member 8 mounted therein being in engagement with the shoulder 24.

It is desirable that the entire flow of fluid be communicated to the transducer 2 through the taps 10 and 11 for accurately measuring the flow through the bore 7 of the flow measuring apparatus, therefore, the taps 10 and 11 each have an annular recess in the ends thereof to receive a suitable sealing member, such as an O ring. It is also desirable that the O ring seals engage the exterior surface of the frames 19 and 20 at a position surrounding the ports 29 and 30 respectively to avoid leaks possible in metal-to-metal contact.

It has been found that calibration of the flow measuring apparatus is effected by the bore size, screen spacing, size of screen openings, spacing between the upstream and downstream taps and orientation or alignment of the openings in the respective screens. Suitable sizes for the end screens 9 and 14 have been found to be a mesh with 100 to 130 openings per inch and a suitable size for the second or intermediate screen 9 has been found to be a mesh with 300 to 330 openings per inch.

Operation of a flow measuring meter or apparatus 1, constructed as described and shown, includes flowing fluid into the fluid entranceway 5 and then through the screen 8 wherein the flow is converted to laminar flow and the pressure of the flow between the screen 8 and the second screen 9 is measured and conducted to the pressure transducer 2. The fluid then flows through the second screen 9 wherein the openings therethrough are substantially smaller than the openings through the screen 8 which offers sufficient resistance to the flow through the second screen 9 to effect a measurable pressure differential on the upstream and downstream sides thereof and the lower pressure is measured downstream of the second screen 9 and conveyed to the pressure transducer 2 which is operative to translate the differential pressure measurements into an electric or electronic signal which is conveyed to the indicating instrument 3.

The flow measuring apparatus is adapted to accurately measure flow in either direction whereby flow toward the flow measuring apparatus 1 through the exit passage 6 flows through the third foraminous member 14 which effects laminar flow, which is measured at the tap 11 and flow through the second screen 9 effects a pressure reduction which is measured at the tap 10 with the differential pressures being communicated to the differential pressure transducer 2, for use as previously described.

FIGS. 5 and 6 illustrate a modified flow measuring apparatus 31 having heating means 32 for heating end screens 33 and 34 and an intermediate screen 35 above a temperature at which moisture collects on the screens 33, 34, and 35.

It is preferable that the screens 33, 34, and 35 and frames having the screens mounted therein, be removable from a bore 36 of a housing 37 for cleaning, therefore, the heating means 32 is mounted on the exterior of the housing 37. In the illustrated structure, a sleeve 38 is removably mounted on the exterior surface of the housing 37 and suitable insulation 39 is mounted on an interior surface 40 of the sleeve 38 and extends around at least a major portion of the interior periphery thereof. A heating element 41 is mounted on the insulation 39 for heating the housing 37 and thereby the screens 33, 34, and 35 above a temperature at which moisture collects thereon. Such moisture would restrict flow through the respective screens and result in inaccurate pressure measurements of the respiratory gas flow due to resistance variations as the moisture collects on the screens.

In the illustrated structure, the screens 33, 34, and 35 are mounted in frames 42, 43, and 44 respectively, which have an exterior dimension sized to be received within the bore 36 of the housing 37 in a close fit therein. Each of the frames 42, 43, and 44 has a guide member 45 thereon which is received in a groove or way 46 in the interior surface of the housing 37.

The heating element 41 has an interior dimension sized to be in a close fit on the exterior surface of the housing 37 whereby the heat is conveyed to the screens 33, 34, and 35 to heat same to avoid the collection of moisture thereon. A suitable temperature control unit (not shown) is connected to the heating element 41 by a conductor 47. A precision thermistor bead sensor is mounted in a temperature head 48 mounted on the sleeve 38. The sensor controls the power supplied to the heating element 41 so that the power is instantaneously proportional to heat losses due to the ambient and any air or gas flow through the flow measuring apparatus 31.

Operation of the modified flow measuring apparatus 31 preferably includes activating the heating element 41 for a selected time prior to taking measurements and maintaining the heating element 41 activated or energized during operation of the modified flow measuring apparatus 31. Fluid flowing through the modified flow measuring apparatus 1 flows through the screens 33, 34, and 35 and pressure measurements are communicated to the differential pressure transducer 2 in substantially the same manner as for the flow measuring apparatus 1.

It is to be understood that while I have illustrated and described certain forms of my invention, it is not to be limited to these specific forms or arrangement of parts herein described and shown.

What I claim and desire to secure by Letters Patent is:
1. A flow measuring apparatus comprising:
(a) a housing having a bore therethrough and a fluid entranceway and an exit passage in an aligned relation with said bore;
(b) a foraminous member mounted in said housing and extending across said bore, said foraminous member being normal to flow of fluid through said bore and having openings therethrough arranged over the entire area thereof, said openings each having a hydraulic diameter sufficiently small for assuring laminar flow of fluid;
(c) a second foraminous member mounted in said housing and extending across said bore in spaced relation with and downstream of said first named foraminous member, said second foraminous member being normal to flow of fluid through said bore and having openings therethrough arranged over the entire area thereof, said openings through said second foraminous member each having a hydraulic diameter sufficiently small for assuring a measurable pressure differential adjacent opposite sides of said second foraminous member;
(d) a differential pressure measuring instrument;
(e) upstream and downstream pressure sensing means communicating respectively with points upstream and downstream of said second foraminous member and connectable with said differential pressure measuring instrument;
(f) each opening through said second foraminous member has a hydraulic diameter substantially smaller than the hydraulic diameter of the openings through said first named foraminous member whereby said second foraminous member effects a greater resistance to flow there-through than said first named foraminous member;
(g) a third foraminous member mounted in said housing and extending across said bore in spaced relation with and downstream of said second foraminous member, said third foraminous member being normal to flow of fluid through said bore and having openings therethrough arranged over the entire area thereof, said openings through said third foraminous member each having a hydraulic diameter substantially equal to the hydraulic diameter of the openings through said first named foraminous member;
(h) means for spacing said third foraminous member from said second foraminous member a distance substantially equal to the distance between said first named foraminous member and said second foraminous member whereby the flow may be measured in either direction;
(i) means connected to said housing for heating said first named and second and third foraminous members above a temperature at which moisture collects on said foraminous members.

2. The flow measuring apparatus as set forth in claim 1 wherein:
(a) each of said foraminous members are reticulated screens and each of said screens is mounted in a frame received within said housing;
(b) said housing has a way in an interior surface thereof, said way extending substantially parallel to the direction of flow of fluid through said bore; and
(c) each of said frames has a guide member thereon in a fixed relation to the openings in said respective reticulated screen, said guide members each being received in said way whereby the openings in said reticulated screens are positioned in alignment.

3. A flow measuring apparatus comprising:
(a) a housing having a bore therethrough and aligned fluid passages at opposite ends of said bore;
(b) a pair of reticulated and screens mounted in said housing and extending across said bore, said end screens being normal to flow of fluid through said bore and having openings therethrough arranged over the entire area thereof, said openings in said end screens each having a hydraulic diameter sufficiently small for assuring laminar flow of fluid;

(c) an intermediate reticulated screen mounted in said housing and extending across said bore between said end screens, said intermediate screen being normal to flow of fluid through said bore having openings therethrough arranged over the entire area thereof, said openings in said intermediate screen each having a hydraulic diameter sufficiently small for assuring a measurable pressure differential on opposite sides of said intermediate screen;

(d) a pair of spaced ports through said housing and communicating with the interior of said housing adjacent opposite sides of said intermediate screen;

(e) a differential pressure measuring instrument;

(f) means in said ports for connection to said differential pressure measuring instrument;

(g) each opening through said intermediate screen has a hydraulic diameter substantially smaller than the hydraulic diameter of the openings through each of said end screens whereby said intermediate screen effects a greater resistance to flow therethrough than said end screens;

(h) said intermediate screen is positioned between said ports and spaced from each of said ports a distance greater than the hydraulic diameter of said openings through said intermediate screen;

(i) said intermediate screen and said end screens each have the peripheral edge thereof mounted in a frame;

(j) said frames have ports therein, said ports in said frames being alignable with said ports in said housing for communication of flow pressure adjacent opposite sides of said intermediate screen to the differential pressure measuring instrument;

(k) said housing has means for positioning said frames in a position having said ports therein aligned with said ports in said housing;

(l) a sleeve mounted on said housing;

(m) insulation mounted on an interior surface of said sleeve and extending around at least a major portion of the interior periphery thereof;

(n) a heating element mounted on said insulation for heating said intermediate screen and said end screens above a temperature at which moisture collects on said screens.

4. The flow measuring apparatus as set forth in claim 3 wherein:

(a) said heating element is shaped to slidably engage an exterior surface of said housing;

(b) each of said screen frames has a guide member extending therefrom, said guide members each being in a fixed relation to the openings in respective screens; and (c) said housing has a way in an interior surface thereof for receiving said guide members on said screen frames whereby the openings in said screens are positioned in alignment.

References Cited

UNITED STATES PATENTS

| | | | |
|---|---|---|---|
| 3,349,619 | 10/1967 | Millar | 73—205 L |
| 3,504,542 | 4/1970 | Blerins | 73—205 |

JERRY W. MYRACLE, Primary Examiner